United States Patent [19]
Fairburn

[11] 3,915,319
[45] Oct. 28, 1975

[54] ROTATABLE AIRCRAFT STORAGE APPARATUS

[76] Inventor: Robert W. Fairburn, Suite 1100, 100 W. Clarendon, Phoenix, Ariz. 85013

[22] Filed: Dec. 26, 1973

[21] Appl. No.: 427,563

[52] U.S. Cl. ............................ 214/16.1 A; 187/27
[51] Int. Cl. .............................................. E04h 6/06
[58] Field of Search ................. 214/16.1 A, 16.4 R; 187/27, 94; 254/148, 178, 190 R

[56] References Cited
UNITED STATES PATENTS

| | | | |
|---|---|---|---|
| 1,855,534 | 4/1932 | Williams | 214/16.1 A |
| 1,861,461 | 6/1932 | Traube | 214/16.1 A |
| 3,075,654 | 1/1963 | Wheeler | 214/16.1 A |
| 3,140,009 | 7/1964 | Wallace | 214/16.4 R |
| 3,565,217 | 2/1971 | St. Louis | 187/27 |
| 3,599,809 | 8/1971 | Gresham | 214/16.1 A |
| 3,670,464 | 6/1972 | Cutter | 214/16.1 A |
| 3,675,378 | 7/1972 | Neumann et al. | 214/16.1 A |

FOREIGN PATENTS OR APPLICATIONS

| | | | |
|---|---|---|---|
| 1,400,390 | 4/1965 | France | 214/16.1 A |

Primary Examiner—Frank E. Werner
Assistant Examiner—R. B. Johnson
Attorney, Agent, or Firm—Warren F. B. Lindsley

[57] ABSTRACT

A high density aircraft storage complex comprising a plurality of axially rotatable multi-level carrousel storage modules mounted on rail trucks on circular tracks or related components positioned around a central aircraft module hoist and employing electrical hydraulic control systems for rotating the storage carrousel and operating the aircraft hoist module.

4 Claims, 11 Drawing Figures

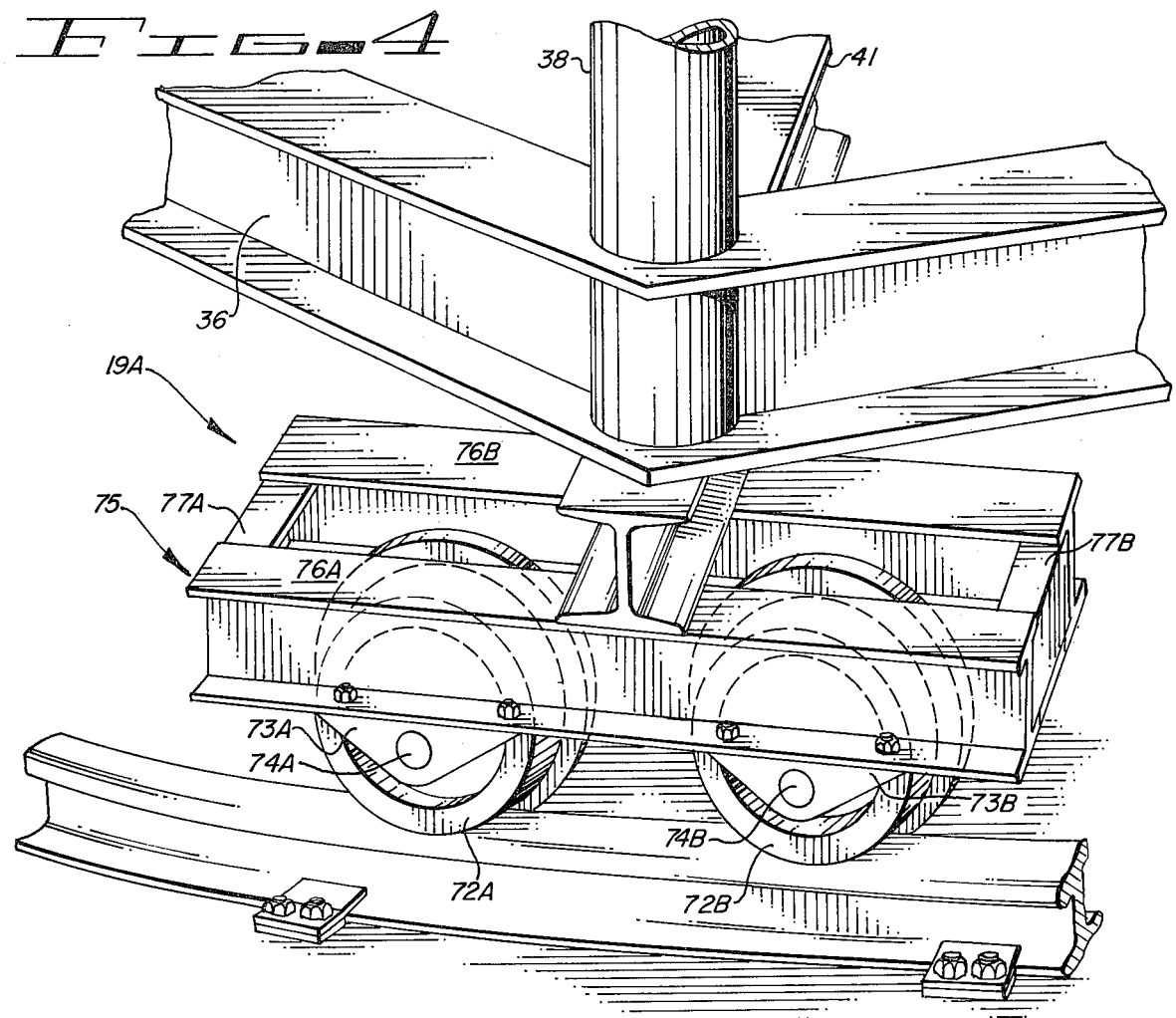
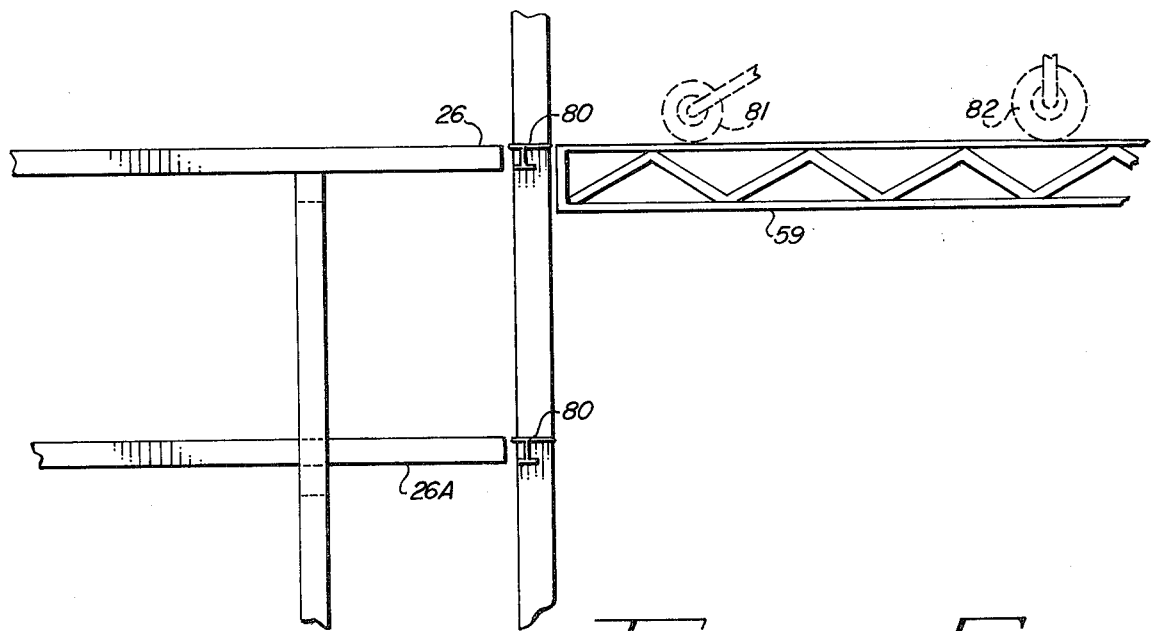

ROTATABLE AIRCRAFT STORAGE APPARATUS

BACKGROUND OF THE INVENTION

The use of private aircraft as a means of transportation has expanded so rapidly that it has severely taxed the nation's private hangar facilities and available airport land for parking aircraft. At some of the major commercial airports, private aviation accounts for a significant percent of the total air operations and the handling and storage of these aircraft has become a serious problem.

Projections into the near future indicate that this problem will be magnified many times by the accelerated growth of air travel. A study conducted at Arizona State University indicates that the aviation industry is now on the threshold of what might be termed a "quantum leap" in growth. The FAA in its 1980 prediction published on Mar. 5, 1969, notes that airplanes will be carrying some 470.0 million passengers in 1980, more than 3 times the fiscal year 1968 total of 152.6 million. In addition, general aviation flying hours will total 48.8 million — an 87% increase over the 22.9 million recorded for fiscal year 1968. With more planes in the air, and with the establishment of more FAA control towers, the number of takeoffs and landings at controlled airports will rise to 171.5 million — more than triple the 53 million of fiscal year 1968. These dynamic growth projections can only intensify the pressure that the private air terminal must endure.

The present methods and facilities for the handling and storing of such aircraft are totally inadequate to meet the projected needs indicated by this rapid growth. Storage of aircraft inside single-level hangars or in outdoor parking areas requires approximately one-fourth acre of land for each airplane. This inefficient use of land is not acceptable where large numbers of planes are involved. Furthermore, the inaccessibility of individual aircraft becomes more serious as the aircraft in such facilities are crowded more closely together. As such operations are expanded the resulting "airport sprawl" leads to serious inconvenience on the part of pilots and passengers who encounter long walks to aircraft pick-up areas and long delays in the delivery of aircraft from remote storage locations.

Therefore, it is obvious that a need exists for a multi-level aircraft hanger for the storage of private aircraft.

SUMMARY OF THE INVENTION

In accordance with the invention claimed, a multi-level aircraft hangar is provided which will meet future needs of the expected level of private aircraft utilization.

It is, therefore, one object of the present invention to provide a novel multi-level aircraft hangar which makes optimum use of land in terms of the number of aircraft stored.

Another object of this invention is to provide a novel multi-level hangar configuration which permits direct and immediate access to the stored aircraft.

A further object of this invention is to provide such a multi-level hangar configuration which provides convenient and rapid handling of the aircraft as they are moved in and out of storage.

A still further object of this invention is to provide a multi-level hangar configuration which not only provides protection against wind and weather but also against such additional hazards as fire and explosions which are often associated with confined storage areas.

A still further object of this invention is to provide an appealing and attractive multi-level hangar for airport environment.

A still further object of this invention is to concentrate aircraft parking and related servicing of aircraft in order to decrease labor and to increase the feasability of providing other services or activities such as aircraft and related sales, hotel and dining accommodations, aircraft parts and supply, consolidated fixed base operations, one-station fueling and easier access to offices and industrial facilities in the immediate complex.

Another purpose of this invention is to reduce the overall cost of airport construction and land requirements for new airports and decrease the operating costs of general aviation facilities while increasing their revenues.

In summary, the primary object of this invention is to promote the development of a terminal complex for private and business aviation that will improve the overall handling, services, sales and storage of the aircraft, and also increase the facilities and services available to the passengers and crews while reducing the present day inconveniences to them.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which:

FIG. 4 is a partial perspective view of one of the supports of one of the multi-level modules as it rests on rail trucks which cause rotation of the module about its central axis.

FIG. 5 is a partial cross-sectional view illustrating the relationship of the elevator platform to the storage level of the hangar.

DESCRIPTION OF THE PREFERRED EMBODIMENT

Figure 1:
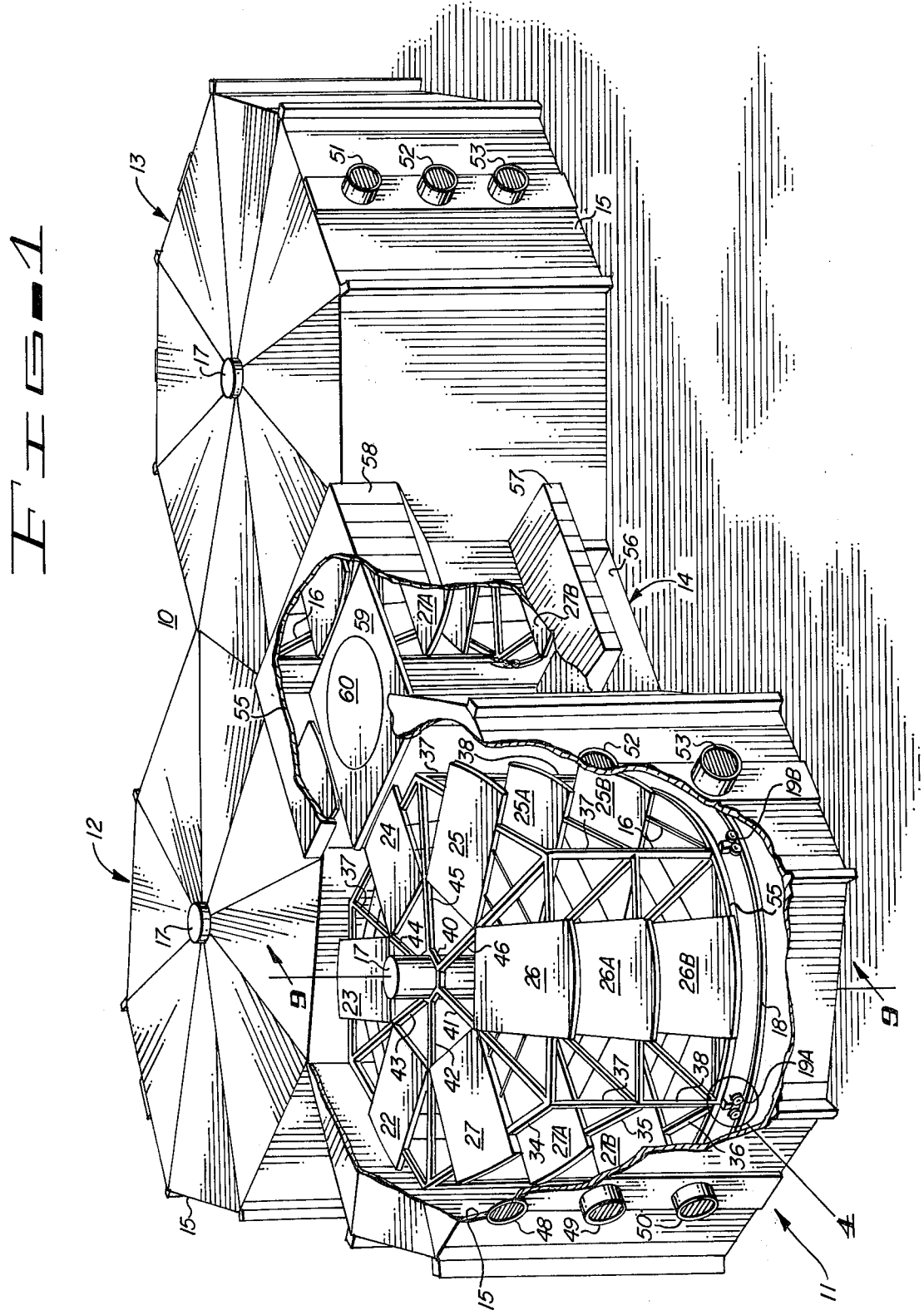
FIG. 1 is a perspective view of a three-module, multi-level aircraft hangar embodying the present invention with cut-away sections of the exterior structure revealing interior structural details.
Figure 2:
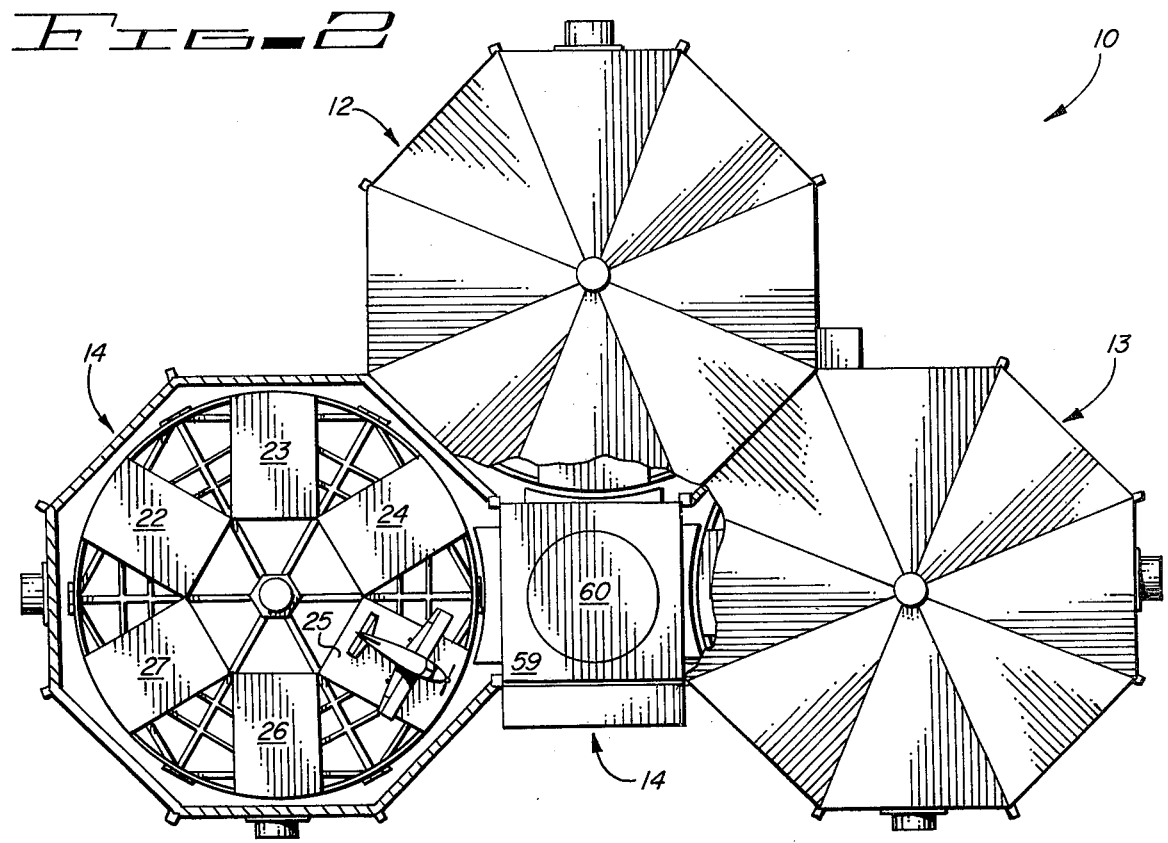
FIG. 2 is a plan view of the hangar shown in FIG. 1, the top covering of one module having been cut-away to reveal interior structural details.
Figure 9:
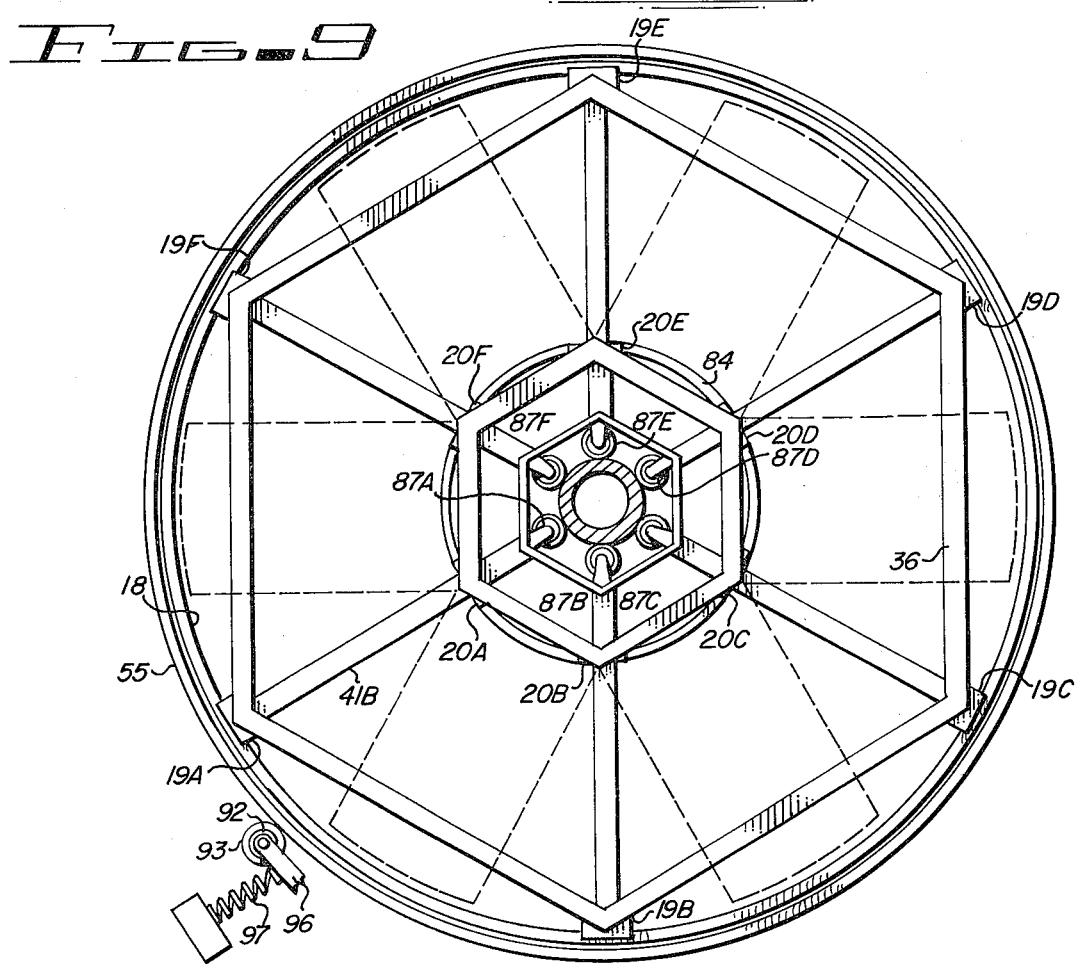
FIG. 9 is a top plan view of one of the multi-level modules illustrating its structural framework along with rail truck locations, drive wheel, center pivot assembly and aircraft parking pad locations.

Referring more particularly to the drawing by characters of reference, FIGS. 1, 2 and 9 illustrate a multi-level aircraft hangar 10 comprising three storage modules 11, 12 and 13 joined by an elevator or hoist module 14.

Each of the storage modules 11, 12 and 13 comprises a fixed outer shell 15, a rotatable inner structure in the form of a multi-level carrousel 16, a cylindrical fixed central column 17, and one or more concentrically arranged circular rails 18 which support by means of rail trucks 19A, 19B and others not shown in FIG. 1, the multi-level carrousel 16.

The carrousels 16 are each illustrated as having a plurality of aircraft parking pads 22-27; 22A-27A and 22B-27B mounted at, for example, three different levels in a structural framework comprising hexagonal grids 34, 35 and 36 one at each level, supported one over the other by vertical struts of which 37 and 38 are typical. There are six such struts positioned between each pair of vertically adjacent hexagonal grids, the six struts supporting one grid above the other at the six corners of the hexagonally shaped carrousels. Each of the grids 34-36 is a flat hexagonal framework of steel beams forming the hexagonal perimeter, a central hexagonal ring 40 and six radial beams 41-46 joining the six corners of the hexagonal perimeter to the central hexagonal ring 40. A circular drive collar 55 surrounds the bottom grid 36 and is fixedly attached at the six corners of grid 36.

Each fixed outer shell 15 has an octagonal vertical profile which provides inside clearance to permit the free rotation of carrousel 16 arranged therein while at the same time affording a readily fabricated structural form. A plurality of ventilating fans located within ports 48-53 provide ventilation of storage modules 11, 12 and 13.

Hoist module 14 has an outer shell 55 with a square or rectangular vertical profile. The entry doorway 56 is covered by an overhanging shelter 57, a second overhanging structure 58 located at the top and to the front of hoist module 14 houses power hoist equipment and enhances the external appearance of hangar 10. The square hoist platform 59 supports a hydraulically powered turntable 60 on which the aircraft are supported while being moved between levels of storage modules 11, 12 and 13.

The rotation of carrousels 16 and the rotation of hydraulically powered turntable 60 facilitates the moving of aircraft into and out of specific storage locations within modules 11, 12 and 13. Thus, for example, if it is desired to store an aircraft on parking pad 27 of module 11, the following procedure is followed: The aircraft is moved through doorway 64 by means of a miniature tractor and is positioned on hydraulically powered turntable 60. Elevator platform 59 is raised to the top level and turntable 60 is rotated until the tail of the aircraft is directed toward the opening into module 11.

Carrousel 16 of module 11 is then rotated until parking pad 27 is aligned with the opening into hoist module 14. The aircraft is then moved onto pad 27, tail first.

FIG. 2 illustrates the high degree of optimization afforded in terms of area utilization within the hangar structure. The pie-shaped sectors of the hexagonal grids on which parking pads 22-27 are mounted, conform to the generally triangular profile on the aircraft. The octagonal profile of storage modules 11, 12 and 13 allow them to be joined together with common vertical walls while at the same time each of them shares a common wall with the square hoist module 14. The octagonal outlines of the storage modules additionally provide the nearly circular configuration required to allow rotation of the carrousels. Structural and operational efficiencies are thus simultaneously provided by virtue of the unique geometric configurations of the storage and hoist modules.

Figure 3:
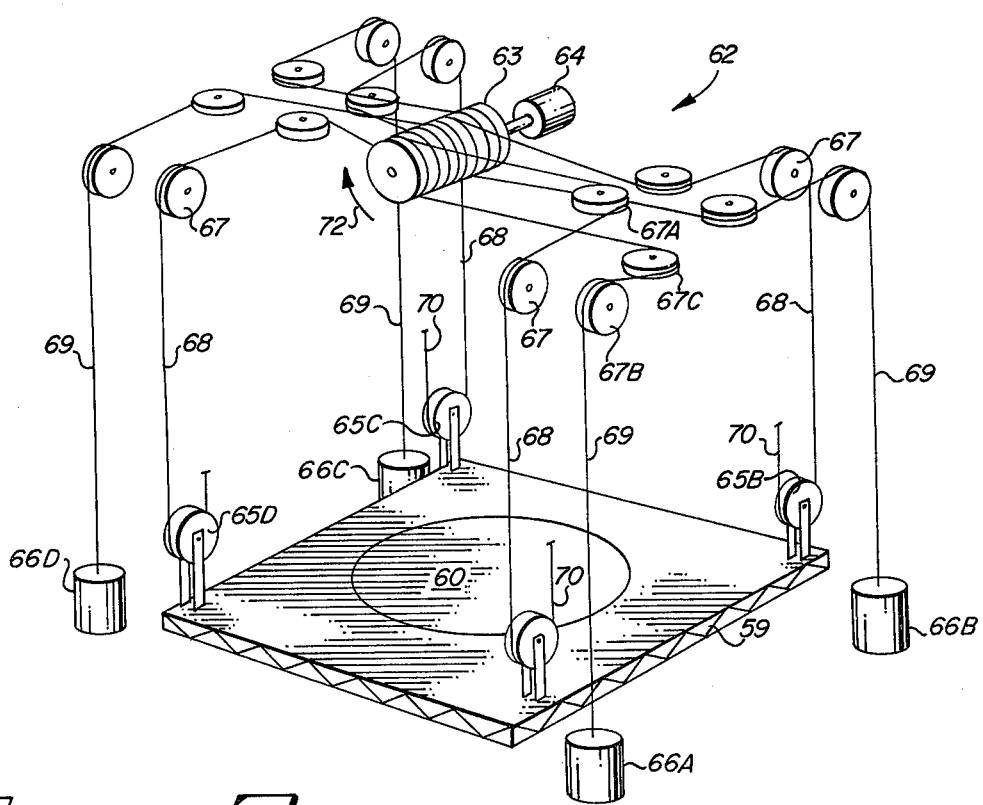
FIG. 3 is a diagrammatic illustration of the mechanical details associated with the operation of the airplane hoist located in the central part of the structure shown in FIGS. 1 and 2.

The hoist system 62 illustrated in FIG. 3 comprises a main drive pulley 63, an electric drive motor 64, four secondary drive pulleys 65A-65D, four counterweights 66A-66D and the necessary sets of guide pulleys 67, drive cables 68 and counterweight cables 69 needed which are shown but not all referenced in FIG. 2 for sake of clarity.

The main drive pulley 63 and drive motor 64 are supported at the top of outer shell 55 of hoist module 14 with the ends 70 of drive cables 68 also secured thereto. Secondary drive pulleys 65A-65D are secured to hoist platform 59.

The following discussion of hoist operation involves only those pulleys, cables and counterweights identified with pulley 65A but is applicable when applied to any of the other three pulley arrangements, comprising a drive tackle and counterweight combination oriented toward one of the four corners of hoist module 14.

To raise hoist platform 59, main drive pulley 63 is rotated in the direction of arrow 72 by motor 64. As pulley 63 rotates, drive cable 68 is wound around and taken up by pulley 63 and as cable 68 is drawn upward from secondary drive pulley 65A through guide pulleys 67 and 67A to be taken up by pulley 63, secondary drive pulley 65A rises vertically at half the speed of travel of cable 68, the secondary drive pulley 65A providing a two-to-one mechanical advantage in terms of the cable tension and drive motor torque required to raise the hoist. The tension produced in cable 69 by counterweight 66A is applied through guide pulleys 67B and 67C to pulley 63 in a direction which aids the torque applied to pulley 63 by drive motor 64 in the raising of platform 59. The total aiding torque thus applied by counterweights 66A-66D is slightly less than that required to offset the weight of hoist platform 59, turntable 60 and other structures and parts contributing to the no-load tension in drive cables 68. Under loaded or unloaded conditions, a relaxation in the torque of drive motor 64 causes hoist platform 59 to move downwardly.

FIG. 4 illustrates the support of carrousel 16 by one of six drive trucks, the one shown being identified as rail truck 19A.

Rail truck 19A comprises two steel wheels 72A and 72B, four bearing assemblies only 73A and 73B of which are shown, axles 74A and 74B and a rectangular framework 75 which includes two parallel I beams 76A and 76B secured at both ends by cross-bars 77A and 77B. The members 76A, 76B and 77A and 77B are made of steel and are welded together. Bearing assemblies 73A and 73B and a like pair at the other end of axles 74A and 74B, not shown, on the far side of wheels 72A and 72B are bolted to I beams 76A and 76B and support the axles in the usual manner under framework 75.

Wheels 72A and 72B and circular rail 18 are similar to those used on railroad tracks and rail equipment and in the preferred embodiment six rail trucks of which 19A and 19B are typical operate on rail 18. One of the six rail trucks is located at each of the six corners of the hexagonal carrousel 16 where one of the radial beams 41-46 of hexagonal grid 36 rests directly on I beams 76A and 76B of the rail truck located at that corner and is preferably secured thereto by welding.

The cross-sectional view of FIG. 5 illustrates the position of hoist platform 59 in position to move an aircraft from the platform to one of the parking pads 22–27, such as pad 26, located on the top level of the carrousel of one of the modules. The edge of an opening in outer shell 55 of hoist module 14 is shown between platform 59 and pad 26. Steel filler bar 80 fills the void between platform 59 and pad 26 when platform 59 is in position for loading. An identical filler bar 80 serves the same function for loading or unloading at pad 29. Aircraft landing wheels 81 and 82 indicate the position of the aircraft during a loading or unloading operation.

Figure 6:
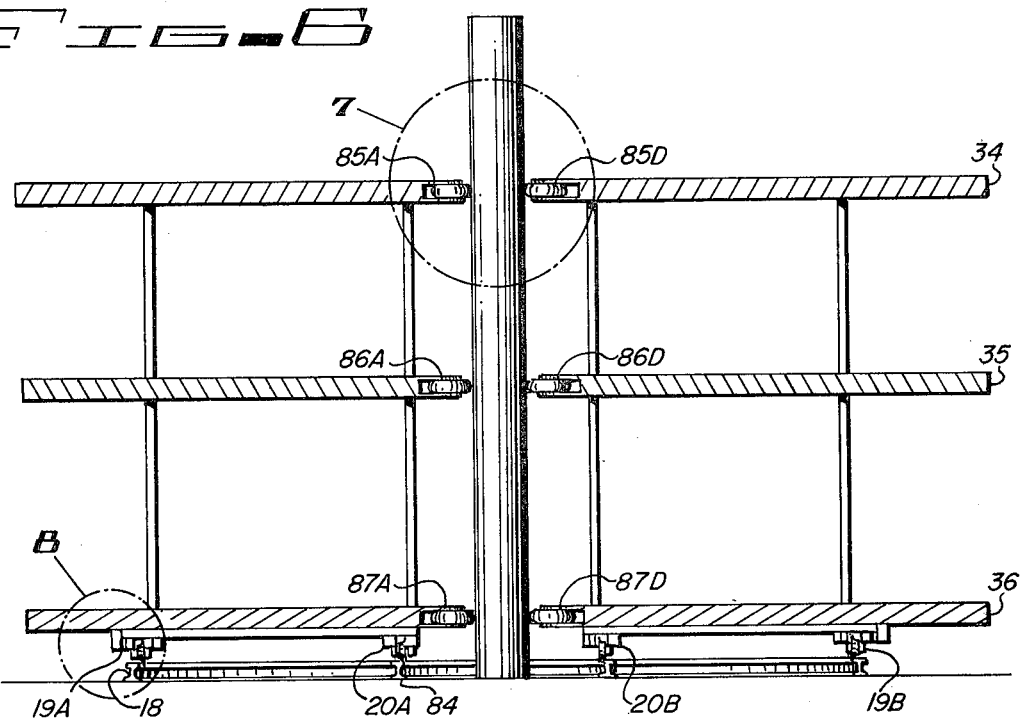
FIG. 6 is a cross-sectional view showing the inner rotating structure of one of the multi-level hangar modules in relationship with the central fixed vertical column about which it rotates.
Figure 7:
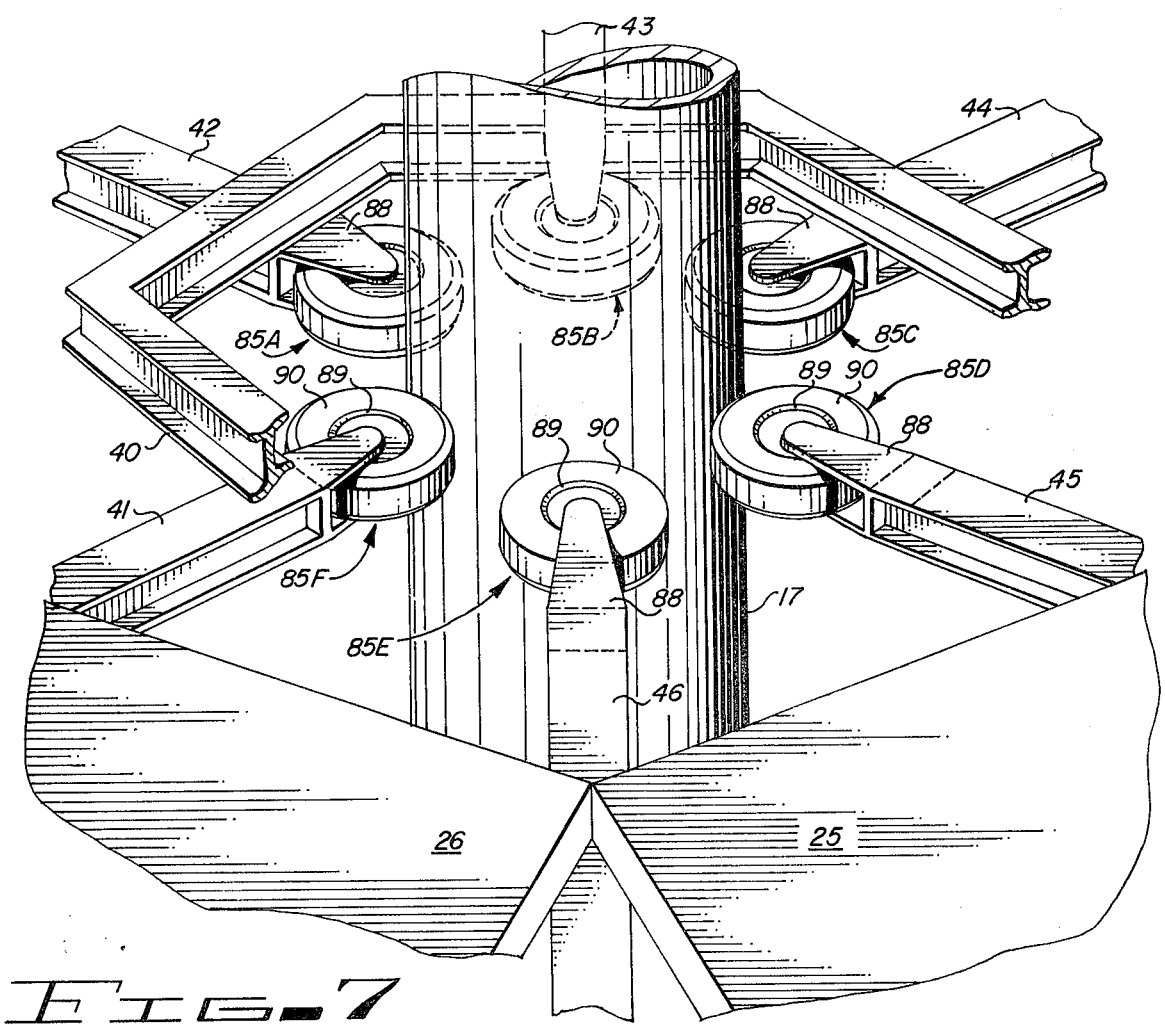
FIG. 7 is a detailed perspective view of section 7 of FIG. 6 illustrating a set of wheels comprising a bearing assembly between the rotating structure and the fixed vertical column.

FIG. 6 illustrates by means of a cross-sectional view the relationship of the multi-level carrousel 16 of each of the modules to the central column 17 and indicates its support by means of a plurality of rail trucks 19A, 20A, 20D, 19B and others not shown running on two circular concentric rails 18 and 84. Radial forces acting on carrousel 16 during its rotation are transferred to column 17 by means of a plurality of wheel-and-axle pivot assemblies 85A–85F, 86A–86F and 87A–87F secured at the inner circumference of central hexagonal ring 40 at each of the hexagonal grids 34–36.

Structural details of the wheel-and-axle pivot assemblies for one level are illustrated in more detail in FIG. 9 where pivot assemblies 85A–85F are shown attached at the inner extremities of radial beams 41–46 which in turn are attached, preferably by welding, to the underside of hexagonal ring 40. Each pivot assembly comprises a U-shaped support bracket 88 which holds the axle of a wheel 89 having a pneumatic tire 90. The pneumatic tire 90 accommodates the unavoidable mechanical tolerances inherent in the carrousel structure and in the geometric relationships between carrousel 16, column 17 and rails 18 and 84, thereby preventing interference between carrousel 16 and column 17 during the rotation of the carrousel. When all of the tires 90 of pivot assemblies 85A–85F are inflated, they bear firmly against the outer surface of column 17 and turn in a pivoting action as carrousel 16 is rotated.

Figure 8:
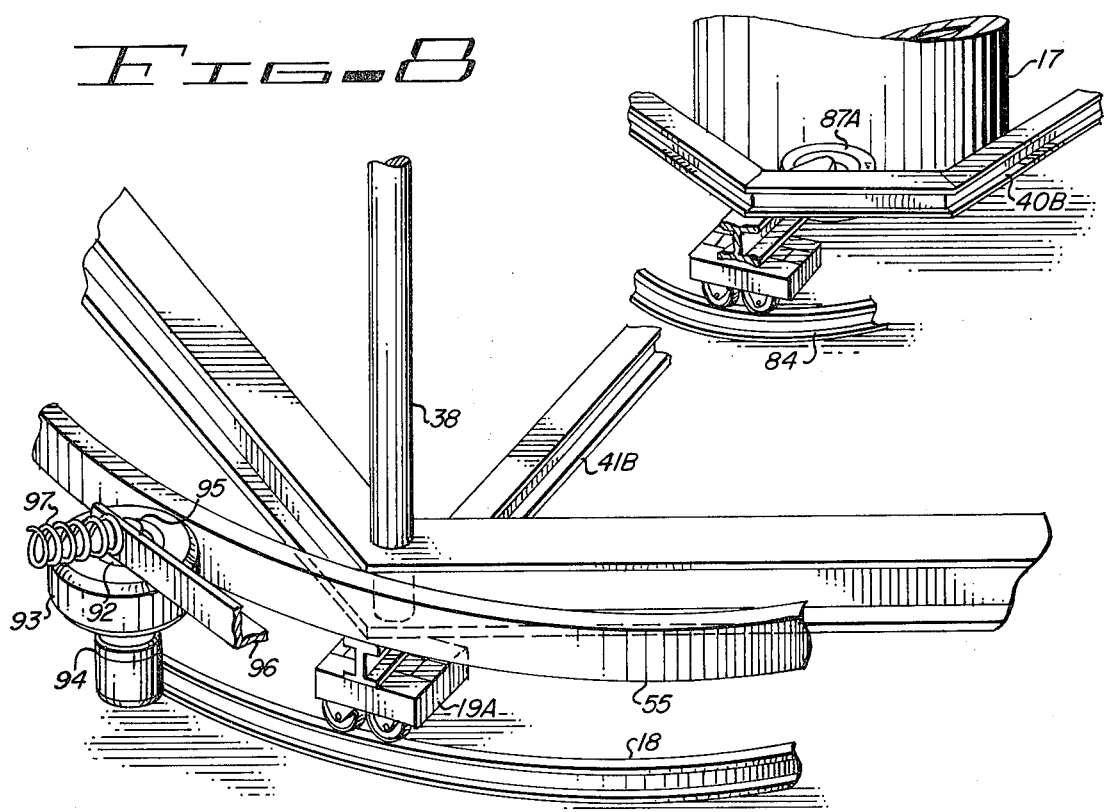
FIG. 8 illustrates the track mounting and drive mechanisms associated with the rotation of one of the multi-level modules.

The partial perspective view of FIG. 8 and the top plan view FIG. 9 of the lower level of carrousel 16 illustrate the means by which carrousel 16 is rotated. Two sets of rail trucks 19A–19F and 20A–20F mounted on the underside of hexagonal grid 36 and running on circular concentric rails 18 and 84 render carrousel 16 rotatable about column 17.

A third circular rail, drive collar 55, surrounds hexagonal grid 36. The inner diameter of collar 55 is appropriate to allow contact between the inner circumference of collar 55 with the six outside corners of hexagonal grid 36 where collar 55 is secured, preferably by welding, to grid 36. A spring-loaded drive wheel 92 fitted with a solid rubber or a pneumatic tire 93 is turned by means of hydraulic motor 94.

The axle 95 of drive wheel 92 is attached to a pivot bar 96 which aligns wheel 92 with collar 55 and spring 97 attached to pivot bar 96 forces tire 93 of wheel 92 against collar 55 with sufficient force to provide the necessary friction between tire 93 and collar 55 to allow carrousel 16 to be rotated as wheel 92 is turned by motor 94. In the preferred embodiment collar 55 has a tangential velocity of 1.5 miles per hour and the perpendicular force exerted against collar 55 by tire 93 is 2,068 pounds. This perpendicular force exerted by tire 93 is transmitted by pivot assemblies 85A–85F, 86A–86F and 87A–87F to central column 17.

Figure 10:
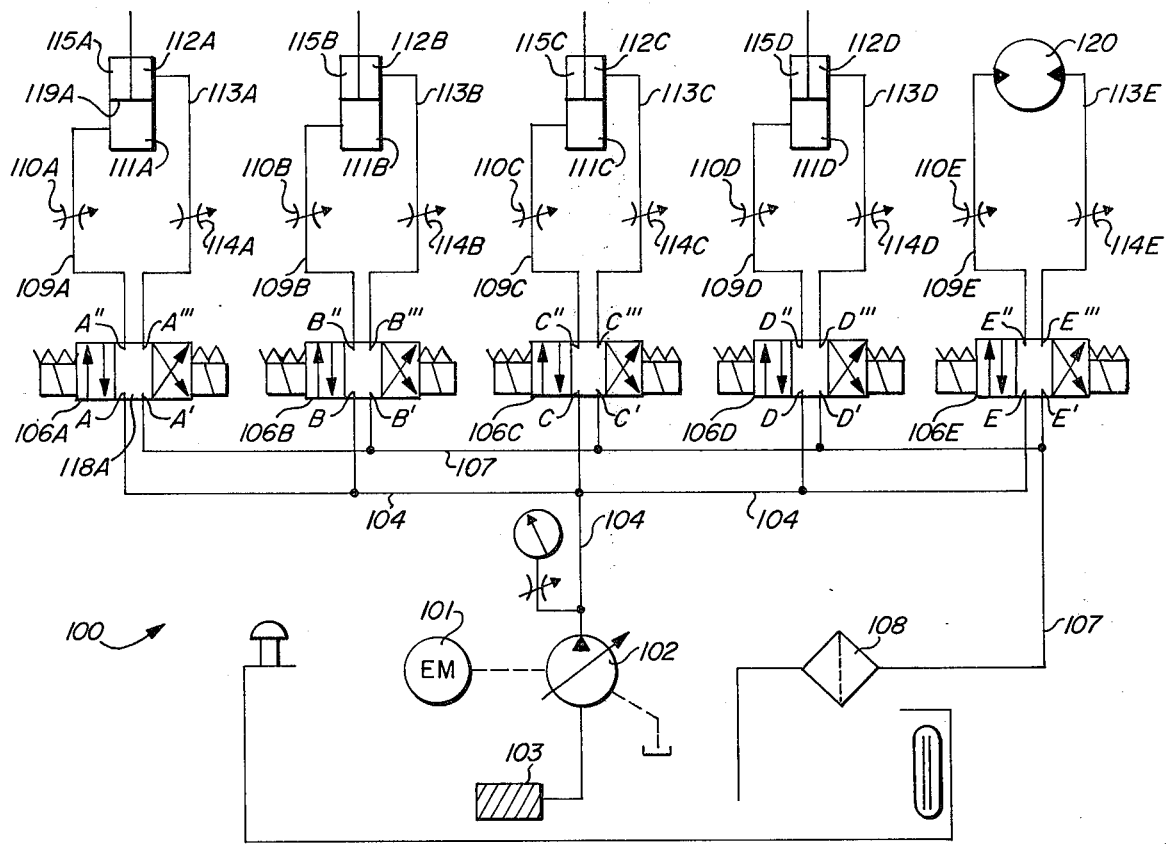
FIG. 10 is a schematic representation of the hydraulic control system for the hoist turntable and for drawbridges operating between the elevator platform and the aircraft storage pads.

FIG. 10 illustrates schematically the hoist hydraulic system 100 employed to control the elevator 60 and also to operate in a variation of the preferred embodiment a set of four drawbridges, not shown in the drawing, which bridge the gap between hoist platform 59 and aircraft storage pads 22-26, 22A–26A and 22B–26B of each module. Like parts are provided with similar reference characters.

Hydraulic system 102 comprises electric motor 101 driving hydraulic pump 102 which pumps hydraulic fluid from reservoir 103 into a system of hydraulic supply lines 104 delivering fluid to the intake ports A-E of solenoid valves 106A 106F. Return ports A'–E' of valves 106A–106E, respectively, are connected to a system of hydraulic return lines 107 through which the hydraulic fluid returns via filter 108 to reservior 103. Each of the solenoid valves 106A to 106E has two additional ports, A'' – F'' and A''' – E'''. Ports A'' – E'' connect, respectively, via pneumatic lines 109A–109D and flow control valves 110A–110D to lower chambers 111A–111D of bridge-lift cylinders 112A–112D while ports A''' – D''' connect, respectively, via pneumatic lines 113A–113D and flow control valves 114A–114D to upper chambers 115A–115D of bridge lift cylinders 112A–112D.

Each of the solenoid valves 106A–106E comprises four ports for intake or exhaust of pneumatic fluid, internal flow control means and two electric solenoids which set the internal flow control means to one of three conditions, thereby to control the direction of fluid flow or to prevent it from flowing through another hydraulic device or actuator.

Consider, for example, solenoid valve 106A comprising ports A, A', A'' and A''', electric solenoids 116A and 117A and internal flow control means 118A. When solenoid 116A is energized, fluid flowing into port A exhausts through port A'' and flowing upward through line 109A, valve 110A and into lower chamber 111A of cylinder 112A drives piston 119A upward thereby forcing fluid out of upper chamber 115A into line 113A and through valve 114A, into port A''' from whence it is directed by internal flow control means 114A to port A' to be exhausted into line 107. If solenoid 117A rather than solenoid 116A is energized, fluid entering valve 106A at port A is exhausted at port A''' from whence it flows via line 113A, and valve 114A into upper chamber 115A of cylinder 112A, thereby forcing piston 119A downward, causing fluid to be exhausted from lower chamber 111A into line 109A through valve 110A and into solenoid valve 106A at port A'' from whence it is directed by internal flow control means 118A to exhaust through port A' and line 107. If neither solenoid 116A nor 117A is energized, internal flow control means 118A prevents fluid from entering or being exhausted at any of the four ports. In this condition, piston 119A is stationary.

By means of the electrical control of the solenoids associated with the solenoid valves 106A–106D it is thus possible to move independently the pistons 119A–119D in an upward or downward direction or to hold them stationary in any desired position and thereby to raise or lower the draw bridges associated with the four edges of hoist platform 59 in a variation of the preferred embodiment.

In the same manner, solenoid valve 106E controls the direction or inhibits the flow of fluid through hydraulic motor 120 via hydrualic lines 109E and 113E and valves 110E and 114E, thereby controlling the direction of or rotation of motor 120 or holding it stationary. Motor 120 is employed to rotate hoist turntable 60.

The return line filter 108 removes metal particles and other forms of contamination from the hydraulic fluid.

Figure 11:
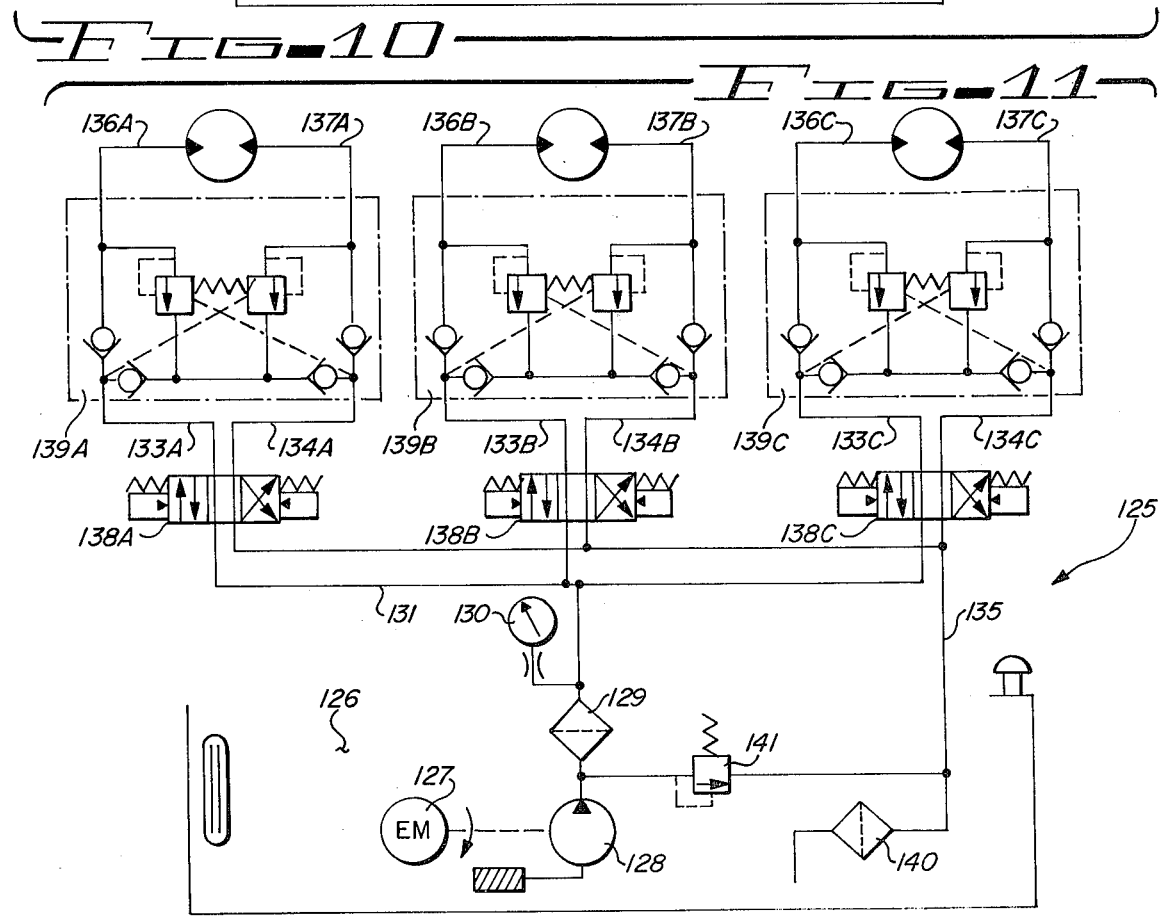
FIG. 11 is a schematic representation of the hydraulic system employed to control the rotation of the multi-level hangar carrousels.

The hydraulic motors 94 which drive the carrousels 16 in each of the storage modules 11, 12 and 13 are driven and controlled by the hydraulic system 125 of FIG. 11 which comprises reservoir 126, electric motor 127, hydraulic pump 128, pressure filter 129, pressure gauge 130, hydraulic lines 131, 132, 133A–133C, 134A–134C, 135, 136A–136C and 137A–137C, solenoid control valves 138A–138C, motion control and lock valves 139A–139C, hydraulic motors 94 and return filter 140.

The operation of hydraulic system 125 is similar to that of hydraulic system 100. Hydraulic pump 128 supplies hydraulic fluid under pressure to the system of hydraulic lines, control valves and motors. Direction of fluid flow through motors 94 is controlled by solenoid valves 138A–138C which in this case are equipped with a means for speed control involving a spool shift mechanism. Motion control and lock valves 139A–139C provide a damping action which insures smoother operation of the drive motors thereby preventing slipping or skidding of drive wheel 93 or the application of shock forces to the carrousel 16.

Pressure gauge 130 allows the operator to monitor the performance of hydraulic pump 129 and relief valve 141 protects the control system against excessive pressure build-up which might result from the failure of a system component or an obstruction in one of the hydraulic lines.

The hydraulic systems 100 and 125 are thus seen to provide drive power and control of all moving elements in the multi-level hangar system including the raising and lowering of hoist platform 59, the rotation of hoist turntable 60, the raising and lowering of the drawbridges in a variation of the preferred embodiment of hoist platform 59, and the rotation of the carrousels 16. All motors which must be located in areas where fumes from aircraft fuels might be present are hydraulic rather than electric, the latter being prone to produce sparks which might initiate fires or explosions. Thus, for example, the turntable and carrousel drive motors 120 and 94 are hydraulic. In the case of motor 64 which drives hoist pulley 63 and also in the case of drive motors 101 and 127 which operate the hydraulic pumps, electric motors are employed but in these applications it is a simple matter to provide adequate ventilation and isolation from evaporating fuels.

Ventilating fans located within ports 48–53 further insure against explosions and fire by thoroughly venting fumes from aircraft fuels.

The disclosed hangar comprising one or more than one level thus comprises a new and improved means for the storage of aircraft. In a six level version of the preferree embodiment approximately 126 aircraft may be stored in each of the three storage modules, 11, 12 and 13 or a total of approximately 400 aircraft can be accommodated by the three-module structure which can be developed on approximately eight acres of land. The storage area required in a conventional airport to accommodate the same number of planes is approximately 100 acres. The striking reduction in land area required results from the optimum geometric configurations of the storage modules and from the multi-level carrousel arrangement.

The organization of the rotating multi-level carrousels in cooperation with the novel hoist design and its rotating turntable permits the immediate access to and the rapid delivery or retrieval of any one of the large numbers of aircraft stored.

The enclosed storage structure also provides protection against wind, weather, and vandalism that is not provided in conventional open storage areas and the appealing structural exterior is much preferred aesthetically in the airport environment over the clutter of the conventional expansive open storage areas.

Although but a single embodiment of the present invention has been illustrated and described, it will be apparent to those skilled in the art that various changes and modifications may be made therein without departing from the spirit of the invention or from the scope of the appended claims.

What is claimed is:

1. An aircraft storage hangar comprising:
   a plurality of enclosed aircraft storage modules arranged on the ground in an arcuate configuration one juxta-positioned to another,
   each of said modules having a base and a common aircraft entrance and exit opening,
   a pair of endless tracks concentrically arranged on the base of each of said modules within the enclosure,
   a vertically positioned column arranged within each module coaxially positioned with said pair of tracks,
   a storage turntable rotatably mounted on said pair of tracks for rotation around said vertical column and having a plurality of vertically separated horizontally positioned parking levels, each of said storage turntables comprises a plurality of levels intergrated in one structure for rotating together,
   each of said parking levels having a plurality of parking zones positioned around its periphery,
   an aircraft reception module having a common entrance and exit opening interconnecting the entrance and exit opening of each storage module,
   said reception module comprising a positioning turntable rotatably mounted in a horizontal plane, and
   aircraft hoist means for moving said positioning turntable to substantially the storage levels of each of the storage modules,
   means for individually rotating each of the storage and reception turntables each storage turntable being mounted on trucks and each truck being operable for moving along one of said pair of endless tracks, and a plurality of rollers rotatably mounted on each level of the storage turntable for engaging the periphery of the associated column as the storage turntable rotates thereabout.

2. The aircraft storage hangar set forth in claim 1 wherein:

said rollers comprise pneumatic tires in frictional engagement with the column of each storage module.

3. The aircraft storage hangar set forth in claim 1 wherein:

said means for rotating each of the storage turntables comprises a drive roller for frictionally engaging the outer periphery of the associated storage turntable, and motor means for rotating said drive roller.

4. The aircraft storage hangar set forth in claim 3 wherein:

said drive roller comprises a pneumatic tire, and
said motor means comprises a hydraulic motor.

* * * * *